United States Patent [19]
Vacca

[11] Patent Number: 5,977,672
[45] Date of Patent: *Nov. 2, 1999

[54] ELECTRIC MOTOR HAVING A BEARING ELEMENT

[75] Inventor: Frédéric Vacca, Behoust, France

[73] Assignee: Valeo Systemes D/Essuyage, La Verriere, France

[*] Notice: This patent issued on a continued prosecution application filed under 37 CFR 1.53(d), and is subject to the twenty year patent term provisions of 35 U.S.C. 154(a)(2).

[21] Appl. No.: 08/773,028

[22] Filed: Dec. 24, 1996

[30] Foreign Application Priority Data

Dec. 27, 1995 [FR] France .................................. 95 15549

[51] Int. Cl.$^6$ ............................. H02K 5/16; F16C 27/06; F16C 35/06
[52] U.S. Cl. ................................ 310/90; 310/43; 310/91; 29/596; 384/903
[58] Field of Search .................................. 310/90, 91, 42, 310/43, 67 R; 384/539, 903, 203, 204, 209, 213, 214, 412, 420, 424

[56] References Cited

U.S. PATENT DOCUMENTS

| | | | |
|---|---|---|---|
| 3,250,932 | 5/1966 | Tupper | 310/90 |
| 3,794,869 | 2/1974 | Apostoleris | 310/90 |
| 4,910,424 | 3/1990 | Borcherding | 310/90 |
| 4,922,162 | 5/1990 | Shiraki et al. | 310/268 |
| 4,938,613 | 7/1990 | Griffin et al. | 384/526 |
| 4,944,610 | 7/1990 | Berg | 384/147 |
| 4,968,910 | 11/1990 | Meier et al. | 310/42 |
| 4,980,587 | 12/1990 | Yonei et al. | 310/67 R |
| 5,074,679 | 12/1991 | McLarty | 384/526 |
| 5,182,482 | 1/1993 | Burke | 310/89 |
| 5,185,544 | 2/1993 | Takada | 310/58 |
| 5,258,672 | 11/1993 | Wrobel | 310/42 |
| 5,293,094 | 3/1994 | Flynn et al. | 310/323 |
| 5,317,224 | 5/1994 | Ragaly | 310/58 |

FOREIGN PATENT DOCUMENTS

| | | | |
|---|---|---|---|
| 0 485 001 | 5/1992 | European Pat. Off. | 310/90 |
| 2 152 294 | 7/1985 | United Kingdom | 310/90 |
| 2 161 029 | 2/1986 | United Kingdom | 310/90 |

OTHER PUBLICATIONS

French Search Report dated Oct. 21, 1996.

*Primary Examiner*—Nestor Ramirez
*Assistant Examiner*—Tran N Nguyen
*Attorney, Agent, or Firm*—Morgan & Finnegan, L.L.P.

[57] ABSTRACT

A direct current electric motor, especially one for driving a fan or blower in a motor vehicle ventilating system, has a motor shaft, a bearing ring around the free end of the motor shaft, and a casing which includes an end plate carrying a bearing element formed with a cylindrical internal face, which defines a housing in which the bearing ring is received. The fixed bearing element has a base portion and a free edge at the opposite axial end of the bearing element from the base. The bearing is formed with reliefs adjacent to the free edge of its fixed element. These reliefs project radially towards the axis from the internal face of the bearing.

15 Claims, 2 Drawing Sheets

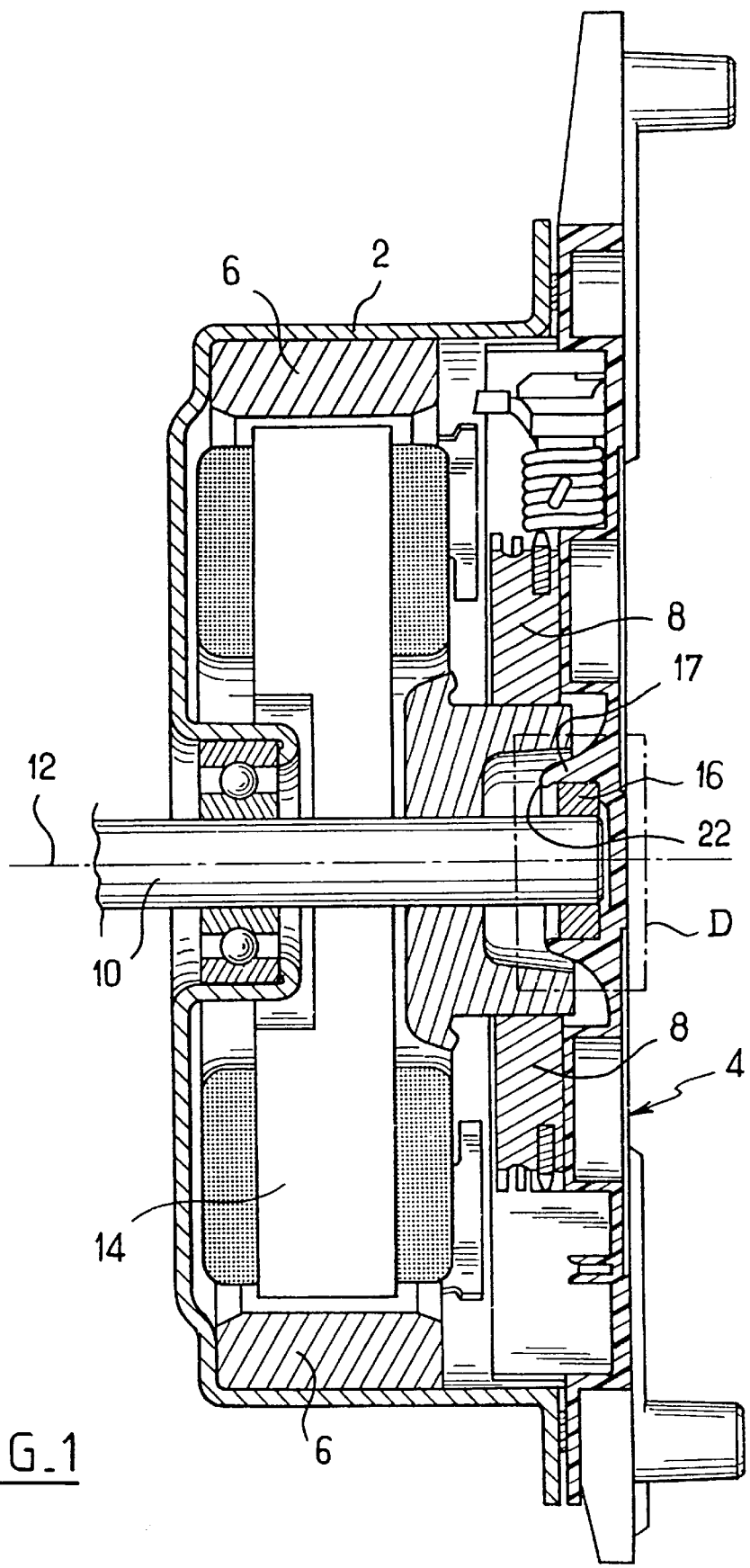
FIG_1

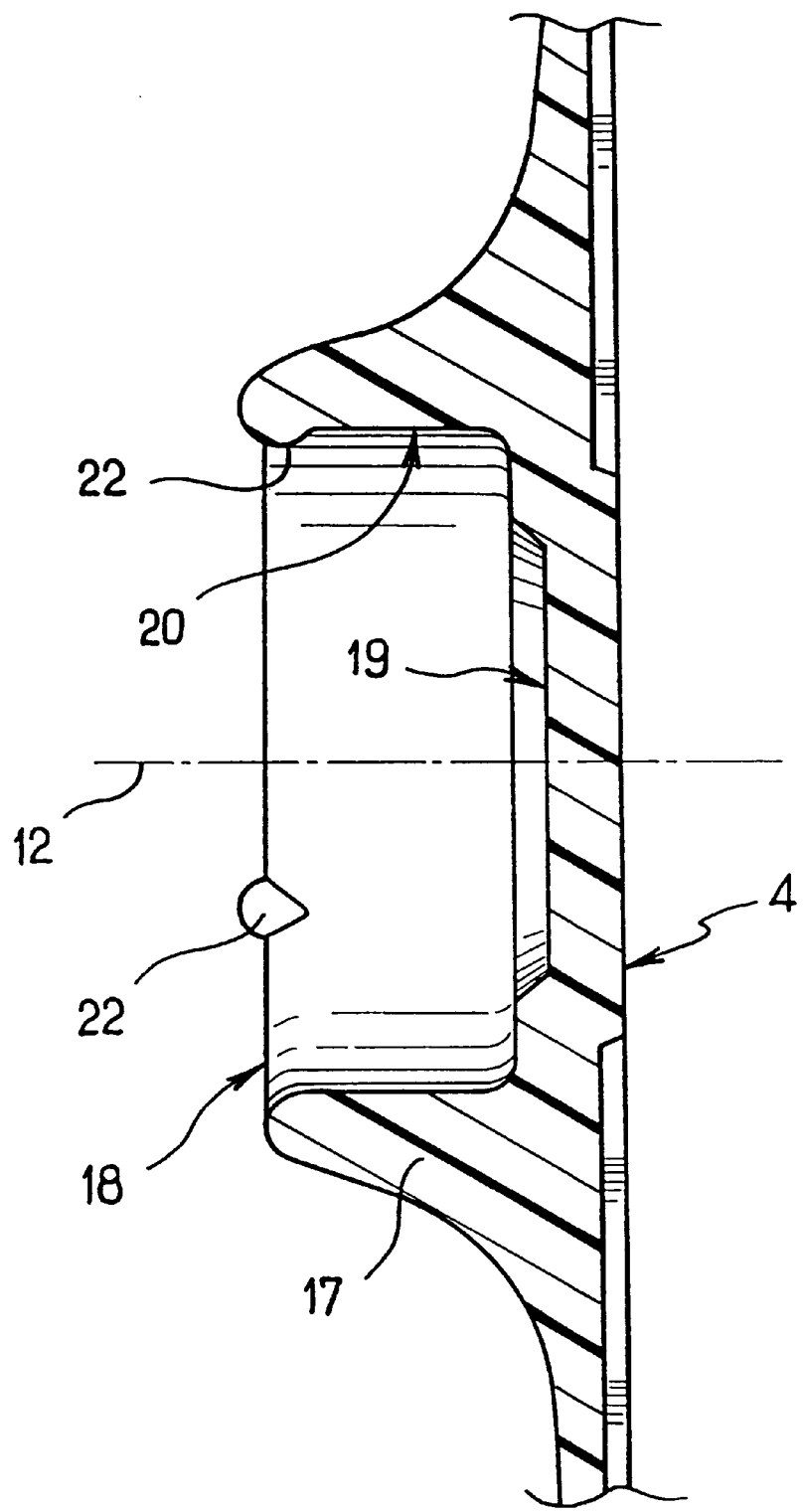
FIG_2

ELECTRIC MOTOR HAVING A BEARING ELEMENT

FIELD OF THE INVENTION

This invention relates to direct current electric motors, and particularly, though not exclusively, to such motors intended for driving a fan or a blower in a ventilating system or the like for a motor vehicle.

BACKGROUND OF THE INVENTION

European patent specification No. EP 0 343 126A describes a direct current motor which has the advantage of having a short axial length. This motor has a rotating shaft and an end plate which closes the open end of the casing of the motor, the end plate being of a plastics material and including a fixed bearing element which defines a cylindrical housing, in which a terminal end of the motor shaft is received.

In practice, motors of that type which are available commercially also include a bearing ring which is engaged on the terminal end of the motor shaft and which is received in the housing, into which it is force-fitted. However, in spite of this force-fitting, there is still a danger that, during operation of the motor, the ring will escape little by little from the housing, especially under the effect of vibrations.

DISCUSSION OF THE INVENTION

An object of the invention is to provide a direct current motor which is of a comparable compactness to that described above in the axial direction, but which does not carry with it any risk of the bearing ring escaping from the housing.

According to the invention, the invention provides a direct current electric motor having a rotatable shaft, a ring engaged on a terminal end of the shaft, and a casing comprising an end plate which includes a fixed bearing element, an internal cylindrical face of which defines a housing in which the ring is received, the fixed bearing element having a base and a free edge opposed to the base, characterized in that the fixed bearing element also includes reliefs adjacent to the edge of the bearing and extending radially towards the axis of the housing, the reliefs projecting from the internal face of the fixed element.

The reliefs thus lie in the escape path of the bearing ring, so preventing it from moving out of the housing.

Further features and advantages of the invention will appear more clearly on a reading of the following detailed description of a preferred embodiment of the invention, which is given by way of non-limiting example only and with reference to the accompanying drawings.

BRIEF DESCRIPTION OF THE DRAWINGS

FIG. 1 is a view in axial cross section of a motor in accordance with the invention.

FIG. 2 is an enlarged view of the detail indicated at D in FIG. 1, showing a part of the end plate of the motor by itself.

DESCRIPTION OF A PREFERRED EMBODIMENT OF THE INVENTION

With reference first to FIG. 1, this shows a direct current motor for driving a ventilating fan or blower in a ventilating system installed in a motor vehicle. The motor consists of a fixed part and a rotating part. The fixed part comprises a metal body shell 2 of generally cylindrical form, having a base wall at one end, an end plate 4 of plastics material closing the body shell at its other end, permanent magnets (or ferrites) 6 fixed to the body shell, and brushes 8 which are fixed to the end plate 4, and which make contact with the rotating part of the motor in the usual way. The rotating part of the motor comprises a rotatable drive shaft 10 defining an axis of rotation 12, with the shaft 10 extending through the base wall of the body shell; and an armature 14 which is mounted on the drive shaft.

A metallic bearing ring 16 is engaged on the terminal end of the drive shaft 10 within the motor. The end plate 4 includes a fixed bearing element 17 having a cylindrical inner face 20 (see FIG. 2), which is centered on the axis 12 and which defines a housing in which the bearing ring 16 is received. The bearing element 17 has a base 19 at one of its axial ends, and an edge 18 at the opposite end. The diameter of the bearing ring 16 is substantially identical to the diameter of the housing, and the ring 16 is force-fitted in the latter. The fixed bearing element and the bearing ring thus provide location and guidance for the terminal end of the shaft 10.

Now referring more particularly to FIG. 2, the bearing element 17 is formed with three reliefs 22, which in this example are in the form of projecting bosses, each having a circular profile parallel to the axis 12. Only two reliefs out of the three can be seen in FIG. 2, because of the cross section of the latter. The reliefs 22 extend radially towards the axis 12, and project from the cylindrical inner face 20 of the bearing element. They also project in the axial direction from the free edge 18. Three reliefs 22 are spaced apart at regular intervals over the circumference of the free edge 18, so as to define between them angles of 120 degrees about the axis 12. The reliefs 22 are formed integrally by moulding with the end plate 4. In this example, and by way of example only, the diameter of the cylindrical housing is 14 mm, while the reliefs 22 project by 0.5 mm from the face 20 towards the axis 12.

In the assembly operation, the bearing ring 16 is force-fitted between the reliefs 22. The rounded form of these reliefs gives rise to a ramp effect by contact with the edge of the bearing ring 16, and this ramp effect causes the reliefs to move apart radially by elastic deformation as the bearing ring 16 is introduced into the housing. Once the ring has passed the reliefs and is properly fitted in the housing, the reliefs return to their initial position. They then project into any outward path of the ring 16, thus preventing the latter from escaping from the housing.

It is of course possible to apply numerous modifications to the invention without departing from its scope. For example, the form of the reliefs can be modified, and they can for example be made in the form of fingers or claws, having a point which is directed towards the interior of the housing. The number of reliefs may be less than three or greater than three. The reliefs could be located on the internal face 20, at a small distance away from the edge 18.

The invention is applicable, where appropriate, to fields other than those of motor vehicle ventilating systems.

What is claimed is:

1. A direct current motor comprising: a casing, the casing including an end plate; a fixed bearing element carried by the end plate and defining a cylindrical internal face to form a cylindrical housing; a cylindrical bearing ring having a transverse end received in the housing; a rotatable motor shaft having an axis of rotation and a terminal end engaged in the bearing ring, the fixed bearing element having a base portion at one axial end and a free edge at the opposite axial end in alignment with the axis of rotation, wherein the fixed bearing element further includes radially movable salient elastic reliefs formed as bosses on the cylindrical internal face and protruding radially inwardly from the internal face in a direction toward the axis of rotation and wherein the reliefs protrude into the housing toward the axis of rotation in order to extend across the cylindrical bearing ring transverse end to obstruct axial movement of the bearing ring along the axis of rotation.

2. A motor according to claim 1, being a motor of a motor vehicle ventilating system.

3. A motor according to claim 1, wherein the bearing ring is force fitted into the housing between the reliefs.

4. A motor according to claim 1, wherein the fixed bearing element is a plastic material.

5. A motor according to claim 1, wherein there are three reliefs.

6. A motor according to claim 1, wherein the protruding bosses have a circular profile.

7. A motor according to claim 1, wherein the reliefs are formed integrally by molding with the end plate.

8. A motor according to claim 1, wherein the reliefs are in the shape of claws.

9. A motor according to claim 1, wherein the reliefs are in the shape of fingers.

10. A motor according to claim 1, wherein the reliefs are on the internal face of the housing.

11. A motor according to claim 10, wherein the reliefs are spaced from the free edge.

12. A motor according to claim 1, wherein the diameter of the bearing ring is substantially identical to the diameter of the housing.

13. A motor according to claim 1, wherein the reliefs are spaced at regular intervals over the circumference of the free edge.

14. A motor according to claim 13, wherein the reliefs define between them angles of 120 degrees about a central axis.

15. A motor according to claim 1, wherein the reliefs are in the form of protruding bosses molded integrally with the end plate.

* * * * *